(12) United States Patent
Syassen

(10) Patent No.: US 7,856,895 B2
(45) Date of Patent: Dec. 28, 2010

(54) METHOD AND DEVICE FOR ACQUIRING CONTOUR DEVIATIONS OF A FLEXIBLE COMPONENT, TAKING INTO ACCOUNT THE COMPONENT'S OWN WEIGHT

(75) Inventor: Freerk Syassen, Stadland (DE)

(73) Assignee: Airbus Deutschland GmbH (DE)

( * ) Notice: Subject to any disclaimer, the term of this patent is extended or adjusted under 35 U.S.C. 154(b) by 6 days.

(21) Appl. No.: 12/087,826

(22) PCT Filed: Jan. 17, 2007

(86) PCT No.: PCT/EP2007/000392

§ 371 (c)(1),
(2), (4) Date: Jul. 16, 2008

(87) PCT Pub. No.: WO2007/082740

PCT Pub. Date: Jul. 26, 2007

(65) Prior Publication Data

US 2009/0031824 A1 Feb. 5, 2009

(30) Foreign Application Priority Data

Jan. 17, 2006 (DE) .................. 10 2006 002 093

(51) Int. Cl.
*G01L 1/00* (2006.01)
(52) U.S. Cl. .................. 73/862.541; 73/760
(58) Field of Classification Search ..............
73/862.391–862.57, 760–860, 862.08–862.541
See application file for complete search history.

(56) References Cited

U.S. PATENT DOCUMENTS

| | | | | |
|---|---|---|---|---|
| 5,088,503 A | * | 2/1992 | Seitz | 600/592 |
| 5,471,406 A | * | 11/1995 | Breyer et al. | 702/168 |
| 5,585,328 A | | 12/1996 | Zimmerman et al. | |
| 5,625,914 A | | 5/1997 | Schwab | |

(Continued)

FOREIGN PATENT DOCUMENTS

EP 0125330 11/1984

(Continued)

OTHER PUBLICATIONS

International Search Report, PCT/EP2007/000392.

*Primary Examiner*—Max Noori
(74) *Attorney, Agent, or Firm*—Lerner, David, Littenberg, Krumholz & Mentlik, LLP

(57) ABSTRACT

A device and method for acquiring deviations between a desired contour and an actual contour of a flexible component, in particular of a large-format metal sheet, taking into account the component's own weight. The device includes a plurality of stamps, arranged on a base area to form a stamp field, for accommodating the component at points of support, wherein each stamp comprises at least one force measuring sensor for measuring a weight force $F_m$ that acts at the point of support, and at least one distance measuring sensor for measuring a travel path $S_m$ travelled by the stamp.

Figure 1:
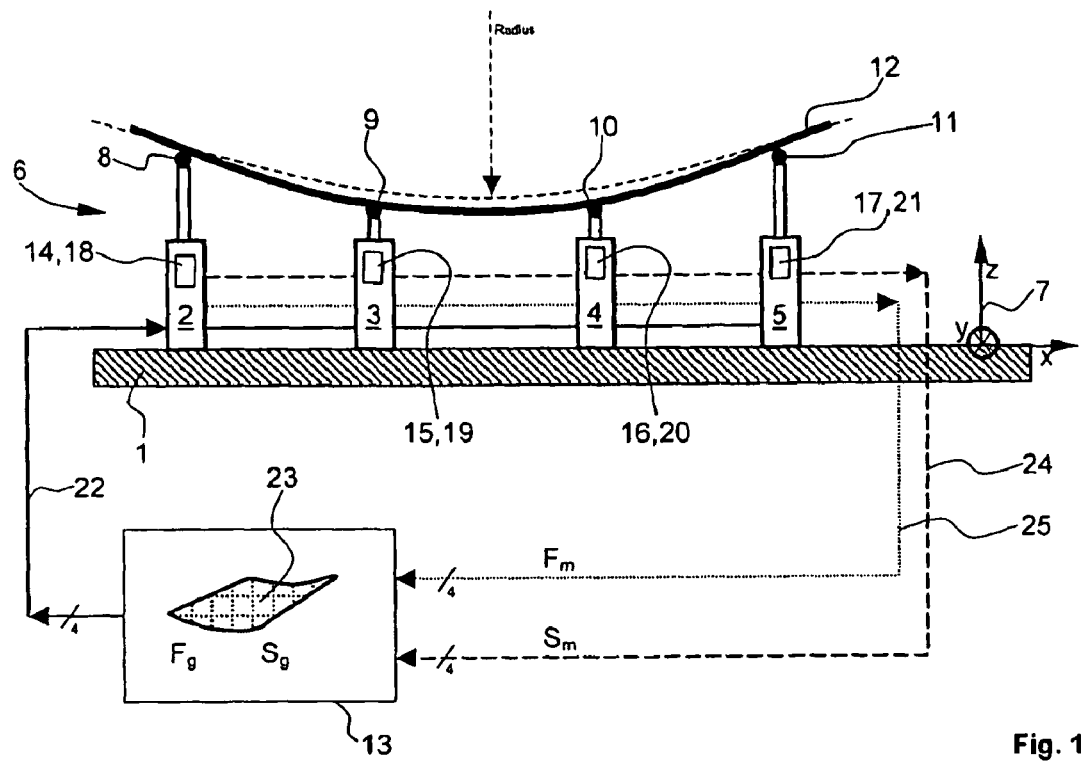

For each point of support a theoretical weight force $F_g$ and/or a theoretical travel path $S_g$ can be determined from component data, wherein the force measuring sensors and the distance measuring sensors are coupled to the computing unit, and the stamps are designed so as to be controlled by the computing unit, and independently of each other can travel at least essentially perpendicularly to the base area.

10 Claims, 1 Drawing Sheet

U.S. PATENT DOCUMENTS

| | | |
|---|---|---|
| 6,160,264 A | 12/2000 | Rebiere |
| 6,487,738 B1 | 12/2002 | Graebe |
| 6,585,328 B1 | 7/2003 | Oexman et al. |
| 2003/0064422 A1* | 4/2003 | McDevitt et al. ........... 435/7.32 |
| 2003/0212352 A1 | 11/2003 | Kahn |

FOREIGN PATENT DOCUMENTS

| | | |
|---|---|---|
| EP | 0935120 | 8/1999 |
| JP | 62-174602 | 7/1987 |
| JP | 2000-146565 A | 5/2000 |
| WO | 0170078 | 9/2001 |
| WO | 02/03023 | 1/2002 |

* cited by examiner

METHOD AND DEVICE FOR ACQUIRING CONTOUR DEVIATIONS OF A FLEXIBLE COMPONENT, TAKING INTO ACCOUNT THE COMPONENT'S OWN WEIGHT

This application claims the benefit of the German Patent Application No. 10 2006 002 093.6 filed Jan. 17, 2006, the disclosure of which is hereby incorporated herein by reference.

FIELD OF THE INVENTION

The invention relates to a device for acquiring deviations between a desired contour and an actual contour of a flexible component, in particular of a large-format metal sheet, taking into account the component's own weight, with a multitude of stamps, arranged on a base area to form a stamp field, for accommodating the component at points of support, wherein each stamp comprises at least one weight force measuring sensor for measuring a weight force that acts at the point of support, and comprises at least one distance measuring sensor for measuring a travel path traveled by the stamp.

Furthermore, the invention relates to a method for acquiring and correcting deviations between the desired contour and the actual contour of the component, in particular with a device according to at least one of claims 1 to 8.

Furthermore, the invention relates to a method for acquiring deviations between the desired contour and the actual contour of the component, in particular with a device according to at least one of claims 1 to 8.

BACKGROUND OF THE INVENTION

According to prior art it has hitherto not been possible to carry out force-free contour measuring on large-format and small-format flexible components, because the contour of the component changes as a result of the component's own weight and depending on its position in the space in which it is measured. Furthermore, stress that is introduced to the component for example by forming- and/or production processes can be covered up by an unfavourable spatial position of the component. Subsequently carried out alignment processes therefore may not lead to the results expected.

As a rule, welded skin fields, for example for fuselage cells, wings, horizontal tail units or the like, are distorted after the welding process as a result of the welding stress experienced so that the actual contour deviates from the desired contour. Nonetheless, the middle region of the skin field may still be in the region of the desired contour. The reason for this, among other things, is the skin field's own weight, as a result of which contour deviations can be covered up.

Automated alignment processes, which depending on the deviations between the desired contour and the actual contour deform the component in a controlled manner (e.g. by shot peening, bending processes, rolling processes or the like), would thus have no influence on the middle region of the skin field. In this case contour accuracy is achieved only by the influence of other regions of the skin field. However, if the position of the skin field in space changes, then the contour deviation that may under certain circumstances appear again due to the component's own weight may lead to installation difficulties, or to the component being rejected.

SUMMARY OF THE INVENTION

There may be a need to create a device and a method for carrying out contour measurements with the device, with which it becomes possible to acquire any contour deviations of components irrespective of the component's own weight, and if necessary to correct such contour deviations.

This need may be met by a device with the characteristics of claim 1.

Since by means of a computing unit for each point of support a theoretical weight force $F_g$ and/or a theoretical travel path $S_g$ can be determined from component data, wherein the force measuring sensors and the distance measuring sensors are coupled to the computing unit, and the stamps are designed so as to be controlled by the computing unit, and independently of each other can travel at least essentially perpendicularly to the base area, deviations between an actual contour and a desired contour of a flexible component can precisely be determined irrespective of said component's own weight. Furthermore, with the use of the method according to the invention the device makes it possible to determine any contour deviations at each point of the component, wherein the achievable spatial resolution is delimited solely by the number or density of the stamps with force measuring sensors and distance measuring sensors.

According to an advantageous embodiment of the device, the stamps can be manually positioned and fixed, independently of each other, approximately parallel in relation to the base area. In this way the device can easily be adapted to various components of different geometric designs.

According to a further advantageous embodiment, the component comprises at least two straps, each comprising at least one guide hole. This embodiment ensures defined initial alignment or initial positioning of the component on the base area.

A further advantageous embodiment provides for the stamps as points of supports for the component to comprise in particular suction cups and/or rubber buffers. This ensures an antiskid connection of the components on the stamps. In addition to gravity-induced support of the component, the use of suction cups also makes it possible to transfer tensile and compressive forces to the component, for example in order to achieve a direct change of the component contour by means of the stamps.

Furthermore, according to claim 9, the object of the invention is met by a method comprising the following steps:
  determining the theoretical weight forces $F_g$ of the component from the component data at the respective points of support,
  moving the stamps until the desired contour of the component has been achieved,
  placing the component onto the stamps,
  measuring the weight force $F_m$ that acts at the point of support of the respective stamp,
  comparing the measured weight forces $F_m$ with the theoretical weight forces $F_g$, wherein a difference signifies a deviation in the contour of the component.

This makes possible the acquisition of contour deviations of the flexible component, which acquisition is largely independent of the component's own weight. Furthermore, components that are supported by the device can, for example by shot peening of selected regions, be brought directly, i.e. without previous lifting and placement in a separate forming device, to assume their desired contour. In this arrangement the method according to the invention in combination with the device makes it possible to detect deviations between the desired contour and the actual contour of the component at each point of support of the component, under which point of support a stamp with at least one force measuring sensor and a distance measuring sensor is arranged.

Moreover, the object of the invention is met by a further method involving the following steps:

- determining the theoretical weight forces $F_g$ of the component from the component data at the points of support,
- placing the component onto at least two stamps to accommodate and align the component,
- moving the remaining stamps from below against the component until the weight forces $F_m$ measured at the points of support essentially correspond to the theoretical weight forces $F_g$ and thus the actual contour of the component has been reached, wherein measuring of the respective travel paths $S_m$ of the stamps takes place, and
- determining the deviations between the actual contour and the desired contour by means of a comparison between the measured travel paths $S_m$ of the stamps and the theoretical travel paths $S_g$, which essentially correspond to the desired contour of the component.

This makes it possible to measure the contour deviations of the flexible component at every point of support of the component on the stamps. In contrast to the method according to claim 9, in the present arrangement the flexible component is however first placed on an "auxiliary support", which is, for example, formed with the use of four stamps. In relation to the base area the remaining stamps are still in a base position without establishing contact with the component. Subsequently, to determine the deviations between the desired contour and the actual contour, the stamps are moved from below towards the component.

Further advantageous embodiments of the arrangement are shown in further claims.

Figure 2:
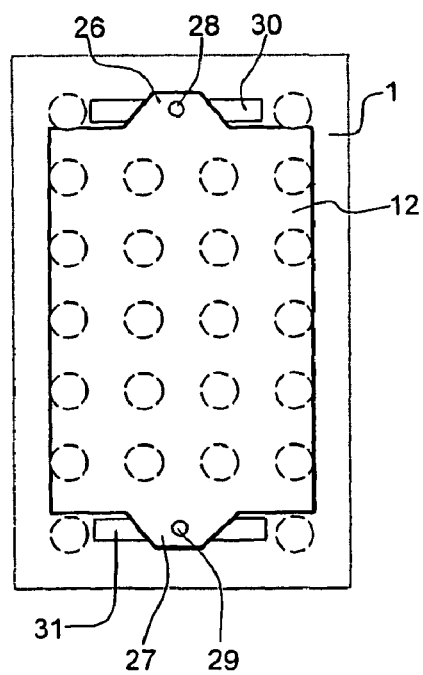
Figure 3:
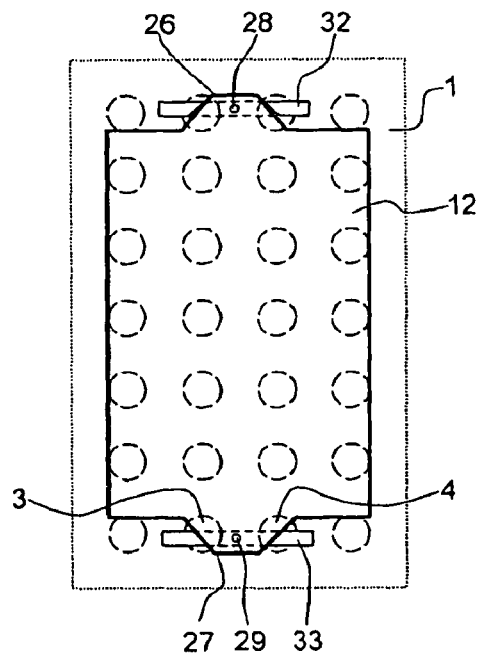

The drawings show the following:

FIG. 1 a lateral view of the device according to the invention for implementing a method according to the invention, FIG. 2 a top view of a first embodiment variant of an auxiliary device for the initial alignment or initial positioning of the component, and FIG. 3 a diagrammatic top view of a second embodiment variant of such an auxiliary device.

In the drawing identical construction elements have the same reference characters.

FIG. 1 is a concept drawing of the device for implementing the methods according to the invention.

For the sake of simplification, only four stamps 2 to 5 are shown on a base area 1. The four stamps 2 to 5 arranged on the base area 1 form a stamp field 6 that also extends perpendicularly to the drawing plane, i.e. parallel in relation to the z-direction of a coordinate system 7. Depending on the dimensions of the component to be checked for contour deviations, a stamp field comprising up to 500 stamps may be required to carry out the measurements. Generally speaking, the stamps are arranged so as to be essentially evenly spaced apart from each other, and arranged on the base area 1 so as to be distributed on said base area 1 essentially in a matrix shape. The distance between stamps in the stamp field 6 is typically between 200 mm and 1000 mm.

Each of the stamps 2 to 5 comprises a point of support 8 to 11 to support a component 12. The points of support 8 to 11 can, for example, be rubber buffers or suction cups so as to ensure antiskid support of the component 12. The stamps 2 to 5 can be freely positioned on the base area 1 (parallel to said base area) in the x- and y-directions of the coordinate system 7, and can be fixed correspondingly. In this way the device according to the invention can be adapted to various component geometries.

The component 12 can, for example, be large-area flexible metal sheets, in particular skin panels made of aluminium alloys for fuselage cells, fuselage shells, aerofoils, horizontal tail units or vertical tail units. These metal sheets can comprise reinforcement profiles (stringers) for stiffening. Basically, the device is, or the two method variants are, also applicable to components made of CFP materials. Furthermore, the device or the method variants according to the invention are in no way limited to carrying out measurements on sheet-like objects. Instead, the component 12 can also involve rather line-shaped components to reinforce all types of skin areas, for example supports, profiled supports, stringers, stiffening elements or the like.

The stamps 2 to 5 may comprise, for example, hydraulic or pneumatic cylinders. As an alternative, the stamps 2 to 5 may also be operated with rack and pinion drives or with threaded spindles. Controlled by a computing unit 13, the stamps 2 to 5 can be individually moved or positioned in the z-direction of the coordinate system 7, and can thus match almost any contour or surface geometry of the component 12.

Each stamp 2 to 5 may comprise a distance measuring sensor and a force measuring sensor. In order to increase measuring accuracy, it is also possible to provide more than one distance measuring sensor and/or force measuring sensor for each stamp. By means of the four distance measuring sensors 14 to 17, the computing unit 13 can measure the respective paths traveled in the z-direction by the stamps 2 to 5. These measured paths, in z-direction, of the respective stamps 2 to 5 are hereinafter abbreviated using the variable $S_m$, wherein in the embodiment shown there are four measured values. Moreover, the four force measuring sensors 18 to 21 make it possible to measure the weight forces acting on the points of support 8 to 11 as a result of the supported component 12. Hereinafter the weight forces measured at the points of support 8 to 11 are abbreviated using the variable $F_m$, wherein in the embodiment shown there are a total of four measured values. The number of the distance measuring sensors and the force measuring sensors increases in line with the number of the stamps actually present in the stamp field.

The measured travel paths $S_m$ as well as the determined weight forces $F_m$ are forwarded to the computing unit 13 for further evaluation. By means of the control line 22 the computing unit 13 can vary or control the travel paths of each individual stamp 2 to 5.

Furthermore, a multitude of component data 23 of the component 12 is stored in the computing unit 13. In this arrangement the component data 23 comprises in particular geometry data and data relating to the nature of the material of the component 12, for example the density and the type of the materials used. Geometry data can, for example, be the complete CAD data of the component 12, which arises anyway in the construction of the component 12. Finally, a digitised image of the real component 12 is stored in the computing unit 13, which digitised image reflects all the essential physical parameters of the real component 12.

Based on the component data 23 it is thus possible, by means of the computing unit 13, to numerically calculate the theoretical weight forces $F_{g1\ldots4}$ which the component 12 would have to exert at the respective points of support 8 to 11 for the desired contour to be achieved. Furthermore, if required, these numerically determined weight forces are subsumed under the abbreviating variable $F_g$. Correspondingly, from the component data 23 it is also possible to calculate the travel paths $S_{g1\ldots4}$ (for example in relation to the base area 1 as a reference), along which travel paths $S_{g1\ldots4}$ the stamps 2 to 5 have to move or travel in the z-direction in order to precisely represent the desired contour of the component 12. For the sake of simplicity, hereinafter these travel paths $S_{g1\ldots4}$ are also designated using the abbreviating variable $S_g$.

The measured values $F_m$ determined by the force measuring sensors 18 to 21 are fed by way of a data line 24 to the computing unit 13 for further evaluation. The distances or travel paths $S_m$, measured by the distance measuring sensors 14 to 17, of the points of support 8 to 11 of the stamps 2 to 5 are correspondingly transmitted to the computing unit 13 by means of the data line 25. The computing unit 13 can, for example, be a conventional personal computer (PC), a process control computer, special measuring hardware or the like. Furthermore, the computing unit 13 may comprise visual display devices (not shown in detail), for example monitors, graphic output units, bar chart displays, digital and/or analog displays, in particular for the graphic 2-D or 3-D visualisation of the measured weight forces $F_m$, travel paths $S_m$ and component data 23. Furthermore, the computing unit 13 comprises known input devices according to the state of the art.

FIGS. 2 and 3 in a diagrammatic top view show two variants of an auxiliary device by means of which the component 12 can be initially aligned or positioned on the base plate 1 of the device. To this effect straps 26 and 27 are arranged on the ends of the component 12 and symmetrical in relation to the longitudinal axis of the component 12. The number and positioning of the straps 26, 27 along the external contour of the component 12 may differ from the arrangement shown. In each case a guide hole 28, 29 is arranged in the straps 26, 27.

In the first embodiment according to FIG. 2 on the base area 1 there are two receivers 30, 31 as an auxiliary device, with guide pins (not shown in detail). For initial alignment or positioning of the component 12 in relation to the base area 1, these guide pins can be inserted in a positive-locking manner into the guide holes 28, 29.

In the second embodiment variant according to FIG. 3, two traverses 32, 33 are arranged or attached on the front stamps 3, 4 as well as on the rear stamps (not designated). The traverses 32, 33 can be firmly connected to the stamps 3, 4 or to the rear stamps (not designated) by means of suitable connection elements, or they can simply be supported in a positive-locking manner by the former. It is decisive that the connection between the traverses 32, 33 and the stamps is essentially free of any play, thus allowing high production tolerances. Furthermore, the connection between the stamps and the traverses has to be designed so that it can be easily disconnected if required. Guide pins (for the sake of clarity of presentation not shown) are arranged on the traverses 32, 33, which guide pins point upwards and which can be inserted into the guide holes 28, 29 of the straps 26, 27 in a positive-locking manner (without play).

The second embodiment variant of the auxiliary device is associated with an advantage in relation to the first embodiment in that with a single device components of different geometric dimensions or contours can be aligned or positioned, while in the first embodiment variant in general a special receiver on the base area 1 is required.

In a way that is different from the two embodiment variants shown, further auxiliary devices for initial alignment or positioning of the component 12 in relation to the base area 1 are imaginable.

For the sake of clarity, the first embodiment variant of the method is explained with reference to the four stamps 2 to 5, which represent the multitude of the remaining stamps from the stamp field 6. In order to implement the method for acquiring and correcting deviations between the desired contour and the actual contour (deviations between the desired surface geometry and the actual surface geometry) of the flexible component 12 by means of the above-described device according to claim 9, the stamps 2 to 5 are initially positioned or moved in the z-direction such that they precisely represent the desired contour of the component 12. It may be necessary to additionally position and affix the stamps 2 to 5 in the x- and y-directions. In an alternative embodiment this positioning of the stamps 2 to 5 in the x- and y-directions on the base area 1 can also take place so as to be controlled or automated by the computing unit 13. In the next step the component 12 is placed on the stamps 2 to 5. In this process, initial (approximate) alignment of the component 12 in relation to the base area 1 can take place as desired with one of the auxiliary devices presented in the context of the description of FIGS. 2 and 3.

Subsequently, the weight forces $F_m$, which have actually been determined in the stamps 2 to 5 by the force measuring sensors 18 to 21 at the points of support 8 to 11, are transmitted to the computing unit 13 by way of the data line 4 for further evaluation.

In a further step, in the computing unit 13 a comparison takes place between the weight forces $F_{m1\ldots4}$, which have been measured at the points of support 8 to 11, and the theoretical weight forces $F_{g1\ldots4}$ that have been measured within the computing unit 13 either beforehand or simultaneously, which theoretical weight forces $F_{g1\ldots4}$ would have to occur if there were no contour deviations in the component 12.

If, for example, the weight forces $F_{m1,4}$, which have been measured at the points of support 8, 11, are larger than the calculated theoretically to be expected weight forces $F_{g1,4}$ in these points of support, then there is a deviation between the actual contour of the component 12 and the predefined desired contour.

Furthermore, this comparison also makes it possible to draw qualitative conclusions about the type, location and size of the component deviation. In the embodiment of FIG. 1 as shown, the contour of the component 12 must be such that it approximately corresponds to the dashed line of FIG. 1, because a comparison of forces shows that the measured weight forces $F_{m1,4}$ are heavier at the points of support 8, 11 than the calculated and thus expected weight forces $F_{g1,4}$ at these points. Consequently, the actual contour, which is shown as a dashed line, of the component 12 has too large a radius (dashed directional arrow) when compared to the desired contour (solid line) of the component 12, and must be reworked if necessary until the radius is correspondingly reduced.

In order to rework or correct the contour deviation shown, the component 12 can in principle remain on the stamp field 6. In this case the radius of the component 12 can be incrementally reduced, for example by means of shot peening or comparable processes, under constant monitoring of the measured weight forces $F_{m1\ldots4}$ and comparison with the theoretical weight forces $F_{g1\ldots4}$, until the desired contour (solid line) of the component 12 is reached.

As an alternative the correction of the contour deviations of the component 12 can also take place in a separate rolling device, bending device or the like. In this case the component 12 must however be lifted off the stamp field 6, which in the case of renewed positioning for rechecking the remaining deviations between the desired contour and the actual contour of the component 12 leads to a change in the position, which may in turn result in further measuring errors.

For the sake of clarity, the second embodiment variant of the method, too, is explained with reference to the four stamps 2 to 5, which represent the multitude of the remaining stamps from the stamp field 6. In order to implement the method for acquiring deviations between the desired contour and the actual contour (deviations between the desired surface geometry and the actual surface geometry) of the flexible component 12 with the use of the above-described device according to claim 12, all the stamps 2 to 5 are initially moved to a home position in relation to the base area 1. Subsequently for example the stamps 3, 4 are moved in the z-direction by defined amounts $S_{m3,4}$ for initial positioning of the component 12 in relation to the base area 1. In this process both auxiliary devices presented in the context of the description of FIGS. 2, 3 can be used for initial positioning of the component 12 in relation to the base area 1. Thereafter, the theoretical weight forces $F_{g1,4}$ that are to be expected at the points of support 8, 11 are calculated from the component data 23. Furthermore, the theoretical travel paths $S_{g1,4}$, which are required until the desired contour of the component 12 has been achieved, are derived from the component data 23. As an alternative, these calculations can also be carried out beforehand.

Thereafter, the remaining stamps 2, 5 are moved from below against the supported component 12 until the weight forces $F_{m2,5}$ measured at the points of support 8, 11 of the stamps 2, 5 largely agree with the associated calculated weight forces $F_{g2,5}$, and the predetermined desired contour (desired surface geometry) of the component 12 has been achieved. In the case of large-format components, to this effect all the stamps of the stamp field, except for those stamps which are used to provide initial support to the component, are moved (readjusted), controlled by the computing unit 13, in the z-direction from below against the component 12 until the weight forces $F_m$ measured at the respective points of support approximately correspond to the previously or simultaneously calculated weight forces $F_g$. During this comparison between the measured weight forces $F_m$ and the calculated weight forces $F_g$, the measuring inaccuracies of the distance measuring sensors 14 to 17, of the force measuring sensors 18 to 21, as well as the positioning accuracies of the stamps 2 to 5 are to be taken into account so that the requirements as to their extent of agreement should not be too stringent.

Finally, any contour deviation that may exist in the component 12 is determined by means of a comparison between the measured travel paths $S_{m2,5}$ of the stamps 2, 5 and the theoretical travel paths $S_{g2,5}$ that have been determined previously or simultaneously, for the purpose of achieving the desired contour of the component 12.

The method makes it possible to quickly and reliably determine any deviations between the specified desired contour of the component 12 and the determined actual contour of the component 12 (deviations between a specified desired surface geometry and a measured actual surface geometry), wherein according to the invention any deformation as a result of the flexible component's 12 own weight may be essentially fully compensated for. This compensation essentially may take place by measuring the weight forces $F_m$ and/or the travel paths $S_m$, which are present at the respective points of support of the component 12, as well as by a comparison of theoretical weight forces $F_g$ determined from the component data 23 and/or the theoretical travel paths $S_g$ at the respective points of support.

In particular in the case of large-format sheet-like components 12, it may be necessary to increase the number of stamps in the stamp field 6 that can be controlled by means of the computing unit 13 to a total number of up to 500, as a result of which the measuring and regulating expenditure or control expenditure considerably increases when compared to the device described in an exemplary manner for reasons of clarity with only four stamps 2 to 5, or when compared to the two method variants to be implemented with the aforesaid.

In the case of essentially rigid or at least only slightly flexible components 12, the method is in principle not applicable.

LIST OF REFERENCE CHARACTERS

1 Base area
2 Stamp
3 Stamp
4 Stamp
5 Stamp
6 Stamp field
7 Coordinate system
8 Point of support
9 Point of support
10 Point of support
11 Point of support
12 Component
13 Computing unit
14 Distance measuring sensor
15 Distance measuring sensor
16 Distance measuring sensor
17 Distance measuring sensor
18 Force measuring sensor
19 Force measuring sensor
20 Force measuring sensor
21 Force measuring sensor
22 Control line
23 Component data
24 Data line
25 Data line
26 Strap
27 Strap
28 Guide hole
29 Guide hole
30 Receiver
31 Receiver
32 Traverse
33 Traverse

The invention claimed is:

1. A device for acquiring and correcting deviations between a desired contour and an actual contour of a large area flexible component, taking into account the component's own weight, comprising:

a plurality of stamps arranged on a base area to form a stamp field for accommodating the large-area flexible component at points of support, wherein each stamp comprises at least one force measuring sensor for measuring a weight force $F_m$ that acts at the point of support, and at least one distance measuring sensor for measuring a travel path $S_m$ travelled by the stamp, and a computing unit for each point of support for determining a theoretical weight force $F_g$ and/or a theoretical travel path $S_g$ from component data, wherein the force measuring sensors and the distance measuring sensors are coupled to the computing unit and the stamps are controllable by the computing unit and independently of each other and can travel at least essentially perpendicularly to the base area, and wherein the stamps can be manually positioned and fixed, independently of each other, substantially parallel in relation to the base area;

wherein the computing unit is adapted for determining a deviation between an actual contour and a desired contour of the component by comparing the measured weight force of each force sensor with the theoretical weight force of the respective force sensor;

wherein, if there are any deviations in the contour, a contour of the large-area flexible component is changed until all weight forces $F_m$ that are measured at the points of support substantially agree with the theoretical weight forces $F_g$, and the desired contour of the large-area flexible component has been achieved.

2. The device of claim 1, wherein the large-area flexible component comprises at least two straps, each comprising at least one guide hole.

3. The device of claim 2, wherein to accommodate and align the large-area flexible component at least two traverses, each comprising at least one guide pin, is arranged on at least two stamps, wherein the guide pins can be inserted into the guide holes.

4. The device of claim 2, wherein on the base area at least one receiver adapted to the respective large-area flexible component is positioned with at least one guide pin for aligning the large-area flexible component, wherein for accommodating and aligning the large-area flexible component the guide pins can be inserted into the guide holes of the straps.

5. A device for acquiring and correcting deviations between a desired contour and an actual contour of a large-area flexible component, taking into account the component's own weight, comprising:
 a plurality of stamps arranged on a base area to form a stamp field for accommodating the large-area flexible component at points of support;
 wherein each stamp comprises at least one force measuring sensor for measuring a weight force $F_m$ that acts at the point of support, and at least one distance measuring sensor for measuring a travel path $S_m$ traveled by the stamp, and a computing unit for each point of support for determining a theoretical weight force $F_g$ and/or a theoretical travel path $S_g$ from component data,
 wherein the force measuring sensors and the distance measuring sensors are coupled to the computing unit and the stamps are controllable by the computing unit and independently of each other and can travel at least essentially perpendicularly to the base area, and wherein the stamps can be manually positioned and fixed, independently of each other, substantially parallel in relation to the base area; and
 wherein the stamps as points of support for the large-area flexible component comprise at least one of suction cups and rubber buffers;
 wherein, if there are any deviations in the contour, a contour of the large-area flexible component is changed until all weight forces $F_m$ that are measured at the points of support substantially agree with the theoretical weight forces $F_g$, and the desired contour of the large-area flexible component has been achieved.

6. The device of claim 1, wherein the stamps comprise at least one of actuating cylinders, hydraulic and pneumatic cylinders.

7. The device of claim 1, wherein the stamps comprise at least one of a spindle drive and a rack and pinion drive.

8. A method for acquiring and correcting deviations between a desired contour and a actual contour of a large-area flexible component, with a device comprising a plurality of stamps arranged on a base area to form a stamp field for accommodating the large-area flexible component at points of support, wherein each stamp comprises at least one force measuring sensor for measuring a weight force $F_m$ that acts at the point of support, and at least one distance measuring sensor for measuring a travel path $S_m$ traveled by the stamp, the method comprising:

a) determining the theoretical weight forces $F_g$ of the large-area flexible component from the component data at the respective points of support,
 b) moving the stamps until the desired contour of the large-area flexible component has been achieved,
 c) placing the large-area flexible component onto the stamps,
 d) measuring the weight force $F_m$ that acts at the point of support of the respective stamp, and
 e) comparing the measured weight forces $F_m$ with the theoretical weight forces $F_g$, wherein a difference signifies a deviation in the contour of the large-area flexible component; wherein, if there are any deviations in the contour, a contour of the large-area flexible component is changed until all weight forces $F_m$ that are measured at the points of support substantially agree with the theoretical weight forces $F_g$, and the desired contour of the large-area flexible component has been achieved.

9. A method for acquiring and correcting deviations between a desired contour and a actual contour of a large-area flexible component, with a device comprising a plurality of stamps arranged on a base area to form a stamp field for accommodating the large-area flexible component at points of support, wherein each stamp comprises at least one force measuring sensor for measuring a weight force $F_m$ that acts at the point of support, and at least one distance measuring sensor for measuring a travel path $S_m$ traveled by the stamp, the method comprising:

a) determining the theoretical weight forces $F_g$ of the large-area flexible component from the component data at the respective points of support;
 b) moving the stamps until the desired contour of the large-area flexible component has been achieved;
 c) placing the large-area flexible component onto the stamps;
 d) measuring the weight force $F_m$ that acts at the point of support of the respective stamp; and
 e) comparing the measured weight forces $F_m$ with the theoretical weight forces $F_g$, wherein a difference signifies a deviation in the contour of the large-area flexible component;
 wherein changing the contour of the large-area flexible component takes place by mechanical deformation of the large-area flexible component;
 wherein, if the are any deviations in the contour, a contour of the large-area flexible component is changed until all weight forces $F_m$ that are measured. at the points of support substantially agree with the theoretical weight forces $F_g$, and the desired contour of the large-area flexible component has been achieved.

10. A method for acquiring deviations between a desired contour and a actual contour of a large-area flexible component, with a device comprising a plurality of stamps arranged on a base area to form a stamp field for accommodating the large-area flexible component at points of support, wherein each stamp comprises at least one force measuring sensor for measuring a weight force $F_m$ that acts at the point of support, and at least one distance measuring sensor for measuring a travel path $S_m$ traveled by the stamp, the method comprising:

a) determining the theoretical weight forces $F_g$ of the large-area flexible component from the component data at the points of support,
 b) placing the large-area flexible component onto at least two stamps to accommodate and align the large-area flexible component,
 c) moving the remaining stamps from below against the large-area flexible component until the weight forces $F_m$ measured at the points of support essentially correspond to the theoretical weight forces $F_g$, and thus the actual contour of the large-area flexible component has been reached, wherein measuring of the respective travel paths $S_m$ of the stamps takes place, and d) determining the deviations between the actual contour and the desired contour of the large-area flexible component by means of a comparison between the measured travel paths $S_m$ of the stamps and the theoretical travel paths $S_g$, which essentially correspond to the desired contour of the large-area flexible component, wherein, if there are any deviations in the contour, a contour of the large-area flexible component is changed until the desired contour of the large-area flexible component has been reached.

\* \* \* \* \*